(12) United States Patent
Komatsu et al.

(10) Patent No.: US 7,641,822 B2
(45) Date of Patent: *Jan. 5, 2010

(54) MASTER INFORMATION CARRIER FOR MAGNETIC TRANSFER AND A METHOD FOR PRODUCING THE CARRIER

(75) Inventors: Kazunori Komatsu, Odawara (JP); Toshihiro Usa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 724 days.

This patent is subject to a terminal disclaimer.

(21) Appl. No.: 11/311,402

(22) Filed: Dec. 20, 2005

(65) Prior Publication Data

US 2006/0099331 A1   May 11, 2006

Related U.S. Application Data

(62) Division of application No. 10/615,293, filed on Jul. 9, 2003, now abandoned.

(30) Foreign Application Priority Data

Jul. 11, 2002   (JP) .............................. 2002-202629

(51) Int. Cl.
    *B29D 17/00*   (2006.01)

(52) U.S. Cl. .................. 264/1.33; 264/1.36; 264/485; 425/810; 427/127; 430/296

(58) Field of Classification Search .............. 264/1.1, 264/1.33, 1.36, 485; 425/810; 360/15; 369/44.13, 369/101; 430/296, 320; 427/127
See application file for complete search history.

(56) References Cited

U.S. PATENT DOCUMENTS

| 5,112,724 A * | 5/1992 | Bradshaw ................. 430/296 |
| 6,347,016 B1 | 2/2002 | Ishida et al. |
| 6,567,227 B2 | 5/2003 | Ishida et al. |
| 6,921,499 B2 * | 7/2005 | Komatsu et al. ........... 264/1.33 |
| 2002/0027732 A1 * | 3/2002 | Arita et al. .................... 360/59 |
| 2003/0026026 A1 | 2/2003 | Komatsu et al. |

FOREIGN PATENT DOCUMENTS

| EP | 915456 | * | 5/1999 |
| JP | 63-183623 A | | 7/1998 |
| JP | 2000-207738 A | | 7/2000 |
| WO | WO 98/03972 | | 1/1998 |

* cited by examiner

*Primary Examiner*—Mathieu D. Vargot
(74) *Attorney, Agent, or Firm*—Sughrue Mion, PLLC

(57) ABSTRACT

A method of producing a master information carrier by scanning a track a number of times. The method produces a master information carrier has a pattern of a magnetic layer representing information to be transferred to a high-density recording slave medium where the track width is not larger than 0.3 μm. The pattern is drawn by scanning a given track a plurality of times with an electron beam whose drawing diameter is smaller than the track width.

9 Claims, 2 Drawing Sheets

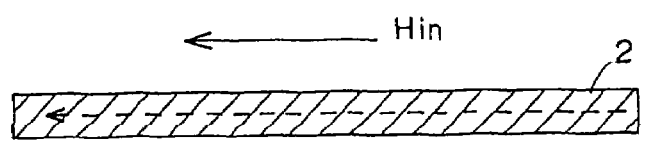
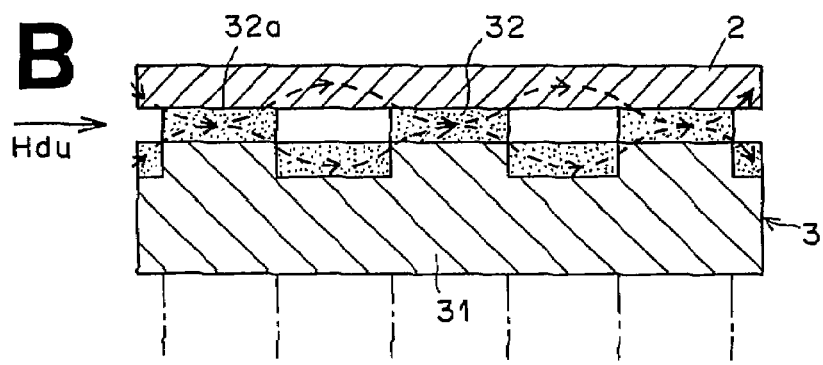
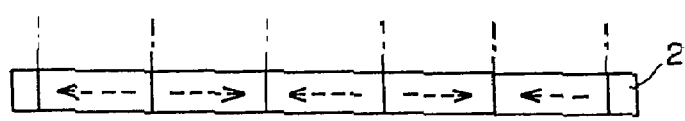
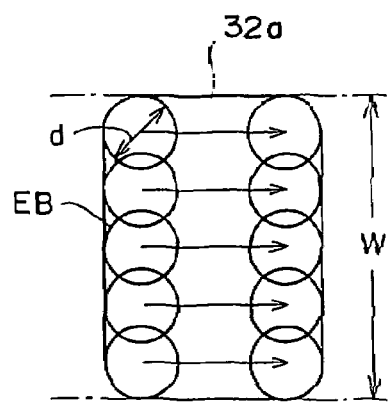 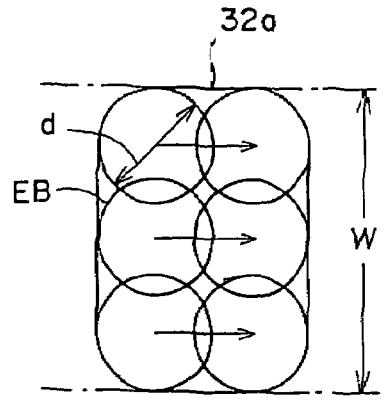

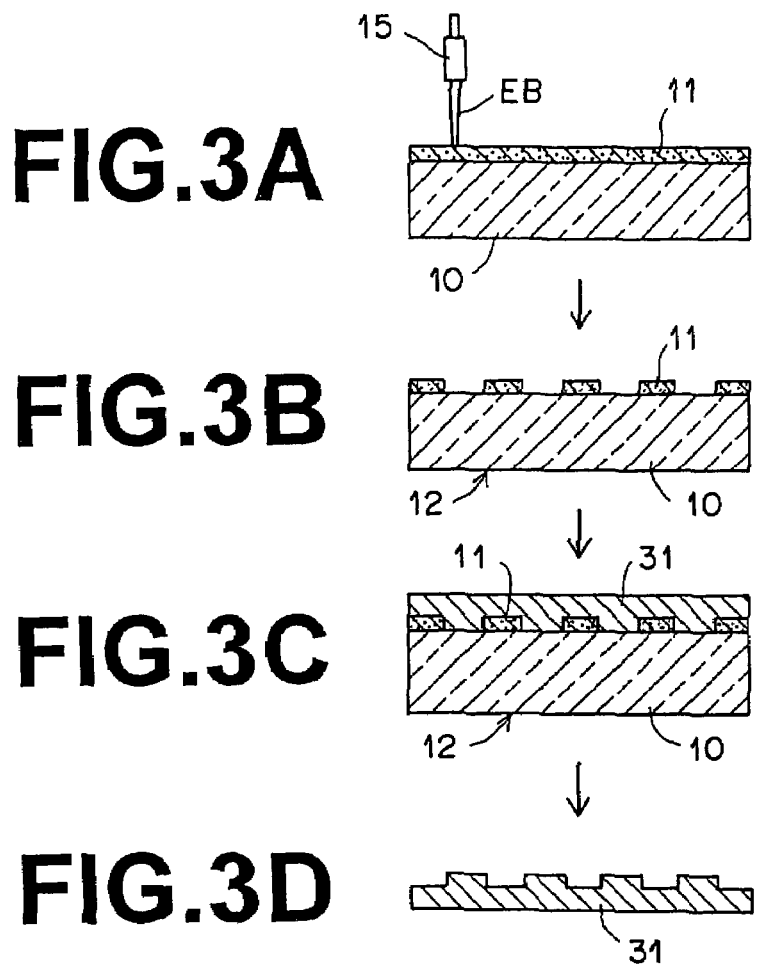
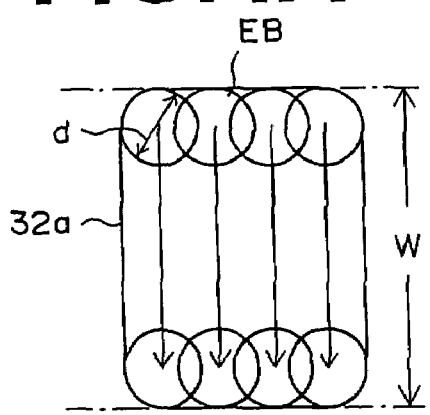
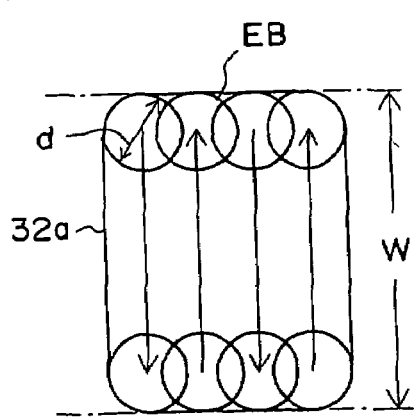

MASTER INFORMATION CARRIER FOR MAGNETIC TRANSFER AND A METHOD FOR PRODUCING THE CARRIER

CROSS-REFERENCE TO RELATED APPLICATIONS

This is a Divisional Application of U.S. application Ser. No. 10/615,293 filed Jul. 9, 2003; the disclosure of which is incorporated herein in its entirety.

BACKGROUND OF THE INVENTION

1. Field of the Invention

This invention relates to a method of producing a master information carrier and a master information carrier for magnetic transfer carrying thereon information to be transferred to a slave medium.

2. Description of the Related Art

As a method of recording information on a magnetic recording medium, magnetic transfer has been used. In the magnetic transfer, the surface of a master information carrier having thereon an irregularity pattern (a pattern of protruding portions and recessed portions) of magnetic material representing information to be transferred is brought into close contact with a surface of a slave medium (a magnetic recording medium) having a magnetic layer and a transfer magnetic field is applied to the slave medium and the master information carrier in this state, thereby recording on the slave medium a magnetization pattern representing the information (e.g., a servo signal) on the master information carrier. See, for instance, Japanese Unexamined Patent Publication No. 63(1988)-183623 and U.S. Pat. Nos. 6,347,016 and 6,567,227.

The master information carrier generally comprises a substrate of, for instance, silicon or glass and an irregularity pattern of magnetic material formed on the substrate by photolithography, sputtering, etching or the like.

Further, the master information carrier may be produced by the use of lithography technology which has been used in producing semiconductors, stamper producing technology which has been used in producing optical disc stampers, or the like.

In order to improve the quality of the signal transferred by the magnetic transfer, it is necessary to accurately form a pattern of a magnetic layer on the master information carrier. It has been found that the shape of the protruding portions of the pattern varies according to the system for drawing the pattern and the magnetic transfer characteristics of the master information carrier are affected by the shape of the protruding portions of the pattern.

For example, in the case where the slave medium is in the form of a rotary magnetic recording disc, an irregularity pattern representing a servo signal comprises protruding portions which are of a square or a rectangle longer in the direction of width of the recording tracks (in a radial direction of the recording disc). The pattern is generally drawn by projecting a laser beam modulated according to the information to be transferred onto a disc-like substrate coated with photoresist while rotating the substrate.

However, as the track width is narrowed to not larger than 0.3 μm, for instance, to meet a demand for a higher recording density, the drawing diameter of a laser beam (the diameter at which a laser beam draws an image on the substrate) comes not to be able to be thinned to draw a pattern of protruding portions in such a narrow tracks. As a result, the protruding portions come to have arcuate end portions and cannot be rectangular in shape. Arcuate end portions of the protruding portions cause a recording loss (azimuth loss) in the transfer magnetic field applied to the master information carrier and the slave medium which are held in close contact with each other, which results in imperfect formation of a magnetization pattern on the slave medium, whereby the signal transferred to the slave medium becomes unsharp.

SUMMARY OF THE INVENTION

In view of the foregoing observations and description, the primary object of the present invention is to provide a master information carrier which can suppress recording loss and provide a high-quality transferred signal even if the track width is narrowed.

In accordance with the present invention, there is provided a master information carrier having thereon a pattern of a magnetic layer representing information to be transferred to a high-density recording slave medium where the track width is not larger than 0.3 μm, wherein the improvement comprises that the pattern is drawn by scanning a given track a plurality of times with an electron beam whose drawing diameter is smaller than the track width.

When W represents the track width, n represents the number of times by which one track is scanned by the electron beam, d represents the drawing diameter of the electron beam and k represents a coefficient representing the degree of overlap, $W = [n-(n-1)k] \times d$. At this time, the value of k should be in the range of not smaller than 0 and not larger than 0.8 and is preferably in the range of not smaller than 0.2 and not larger than 0.8. The value of n should be not smaller than 2, and as the value of n increases and as the value of d decreases, the shape of the protruding portions approximates a rectangle though the drawing time is elongated.

It is preferred that the master information carrier be produced by drawing a pattern by scanning each track a plurality of times with an electron beam whose drawing diameter is smaller than the track width and which is modulated according to the information to be transferred while rotating a disc coated with photoresist, making a substrate having an irregularity pattern by mastering on the basis of the pattern drawn by the electron beam, and forming a magnetic layer on the substrate.

In accordance with the master information carrier of the present invention, each protruding portion of the irregularity pattern has end portions which is substantially straight and not arcuate and the fine pattern can be accurately formed, whereby the recording loss in the transfer magnetic field is reduced, and the magnetization pattern transferred to the slave medium becomes sharp, which results in a high quality transferred signal.

BRIEF DESCRIPTION OF THE DRAWINGS

FIGS. 1A to 1C are views for illustrating the basic steps of magnetic transfer,

FIGS. 2A and 2B are views respectively illustrating ways of drawing the protruding portions in a master information carrier in accordance with embodiments of the present invention, FIGS. 3A to 3D are cross-sectional views illustrating an example of steps of producing the master information carrier, and FIGS. 4A and 4B are views respectively illustrating ways of drawing the protruding portions in a master information carrier in accordance with other embodiments of the present invention.

DESCRIPTION OF THE PREFERRED EMBODIMENT

Basic steps of magnetic transfer to an in-plane magnetic recording medium will be described with reference to FIGS. 1A to 1C, hereinbelow.

An initial magnetostatic field Hin is first applied to the slave medium 2 in one direction parallel to the recording tracks thereof, thereby magnetizing the slave medium 2 in an initial magnetization (DC erasure) as shown in FIG. 1A. Thereafter, the magnetic layer 32 on the upper surface of the protruding portions of the irregularity pattern on the surface of the substrate 31 of the master information carrier 3 is brought into a close contact with the recording surface of the slave medium 2. In this state, a transfer magnetic field Hdu is applied in the direction opposite to the initial magnetic field Hin as shown in FIG. 1B, thereby magnetically transferring the information on the master information carrier 3 to the slave medium 2. Since the transfer magnetic field Hdu is absorbed in the magnetic layer 32 on the upper surface of the protruding portions of the irregularity pattern on the surface of the substrate 31 and accordingly, the magnetic field is not reversed at portions opposed to the protruding portions and is reversed at portions not opposed to the protruding portions. As a result, magnetization pattern corresponding to the irregularity pattern on the master information carrier 3 is transferred to the tracks of the slave medium 2 as shown in FIG. 1C.

The master information carrier 3 is generally disc-shaped and has an irregularity pattern of a magnetic layer 32 representing information such as a servo signal on one side thereof. The master information carrier 3 is brought into a close contact with the slave medium 2 with the other side thereof held by a holder (not shown). Sometimes a pair of master information carriers are simultaneously brought into a close contact with the opposite sides of the slave medium 2 to transfer information to the opposite sides of the slave medium 2 at one time, and sometimes, a master information carrier is brought into a close contact with one side of the slave medium and then another master information carrier is subsequently brought into a close contact with the other side of the slave medium to transfer information to the opposite sides of the slave medium in sequence.

As shown in FIGS. 2A and 2B, protruding portions 32a of the master information carrier 3 are formed on the basis drawings by an electron beam EB. The track width W is not larger than 0.3 μm and the drawings are made by scanning a given track a plurality of times with an electron beam EB whose drawing diameter is not larger than the track width W. For example, the drawings may be made by scanning a given track five times with an electron beam EB whose drawing diameter is relatively small as shown in FIG. 2A, and the drawings may be made by scanning a given track three times with an electron beam EB whose drawing diameter is relatively large as shown in FIG. 2B.

When W represents the track width, n represents the number of times by which one track is scanned by the electron beam, d represents the drawing diameter of the electron beam and k represents a coefficient representing the degree of overlap, $W=[n-(n-1)k] \times d$. At this time, the value of k should be in the range of not smaller than 0 and not larger than 0.8 and is preferably in the range of not smaller than 0.2 and not larger than 0.8. As the degree of overlap increases, the value of the coefficient k increases. The value of n should be not smaller than 2, and as the value of n increases, as the value of d decreases, and as the value of k increases, the shape of the protruding portions approximates a rectangle though the drawing time is elongated.

The roundness of the corners of each protruding portion 32a is governed by the drawing diameter d of the electron beam. Further, the areas of the end faces (the leading end face and the trailing end face as seen in the direction of the tracks) of each protruding portion 32a are governed by the drawing diameter d of the electron beam, the value of n and the value of the coefficient k, and in order to reduce the recording loss, to reduce the drawing diameter d, to increase the value of n and to increase the value of the coefficient k are effective. Taking into account these points, it is preferred to set the value of n as small as possible in order to improve the drawing efficiency.

Though not shown, the actual servo signal includes also protruding portions which are positioned shifted from the tracks by a half track pitch. Such shifted protruding portions are also drawn in the same manner.

In the case where the irregularity pattern representing information to be transferred is a negative pattern reverse to the positive pattern shown in FIGS. 1A to 1C, the information can be magnetically transferred to the slave medium 2 by reversing the directions of the initial DC magnetic field Hin and the transfer magnetic field Hdu. It is preferred that a protective film such as of DLC (diamond-like carbon) be provided on the magnetic layer 32. A lubricant layer may be further provided. It is further preferred that a DLC film 5 to 30 nm thick and a lubricant layer exist. A reinforcement layer such as a Si layer may be provided between the magnetic layer 32 and the protective film to enhance the contact therebetween. The lubricant layer suppresses deterioration in durability of the magnetic layer 32 such as scratches due to friction, which occurs in correcting for a shift generated when the magnetic layer 32 is brought into contact with the slave medium 2.

The substrate 31 of the master information carrier 3 may be formed, for instance, of, nickel, silicon, glass, quartz, aluminum, alloy ceramics, synthetic resin or the like. The irregularity pattern or the pattern of the protruding portions can be formed, for instance, by the use of stamper method.

An example of production of the substrate 31 of the master information carrier will be described with reference to FIGS. 3A to 3D, hereinbelow.

As shown in FIG. 3A, a photoresist solution is applied to a disc 10 of glass or quartz having a smooth surface by spin coating, thereby forming a photoresist layer 11. Thereafter, an electron beam EB modulated according to the information to be transferred such as a servo signal is caused to scan the disc 10 with the photoresist layer 11, while rotating the disc 10, to expose the photoresist 11 along the tracks in a predetermined pattern. The electron beam EB is converged to a drawing diameter d not larger than the track width W by a known electron gun 15. When the scanning times n is 5 (n=5), the position where the electron beam EB impinges upon the photoresist layer 11 is slightly shifted each time the disc 10 makes one rotation so that the protruding portions on one track are drawn in five rotations of the disc 10.

Then, as shown in FIG. 3B, the photoresist 11 is developed and is removed from the areas exposed to the electron beam EB, whereby an original substrate 12 is obtained.

Then a thin conductive layer is formed on the surface of the original substrate 12 and electroforming is applied to the thin conductive layer (mastering), whereby a metal substrate 31 having a positive irregularity pattern following the original substrate 12 is obtained as shown in FIG. 3C. Thereafter, the metal substrate 31 in a predetermined thickness is peeled off the original as shown in FIG. 3D.

The irregularity pattern on the metal substrate 31 is reverse to the irregularity pattern on the original substrate 12. After the back side of the metal substrate 31 is polished, and the metal substrate 31 is provided with a magnetic layer 32 on the surface of irregularity pattern, the metal substrate 31 may be used as a master information carrier 3.

Otherwise, the original may be plated to form a second original and the second original may be plated to form a metal disc having a negative irregularity pattern. Further, a third original may be formed by plating the second original or pressing a resin syrup against the surface of the second original and curing the resin syrup, and a metal disc having a positive irregularity pattern may be formed by plating the third original.

Whereas, an original may be obtained by etching the disc 10 after the disc 10 is provided with a photoresist pattern to form holes through the disc 10 and removing the photoresist 11 after etching. Thereafter, a metal substrate 31 can be obtained from the original in the same manner as described above.

The metal substrate 31 may be formed of Ni or Ni alloys. The metal substrate 31 may be formed by various metal film forming techniques including electroless plating, electroforming, sputtering, and ion plating. The depth of the irregularity pattern (the height of the protrusions) of the metal substrate 31 is preferably 80 nm to 800 nm, and more preferably 100 nm to 600 nm.

The magnetic layer 32 is formed by forming film of a magnetic material by, for instance, vacuum film forming techniques such as sputtering or ion plating or plating. As the magnetic material, Co, Co alloys (e.g., CoNi, CoNiZr, or CoNbTaZr), Fe, Fealloys (e.g., FeCo, FeCoNi, FeNiMo, FeAlSi, FeAl, or FeTaN), NiorNialloys (e.g., NiFe) can be employed. FeCo and FeCoNi are especially preferred. The thickness of the magnetic layer 32 is preferably 50 nm to 500 nm, and more preferably 100 nm to 400 nm.

A master information carrier may be formed by forming a resin substrate by the use of the original produced in the manner described above and providing a magnetic layer on the surface of the resin substrate. As the material of the resin substrate, acrylic resins such as polycarbonate or polymethyl methacrylate, vinyl chloride resins such as polyvinyl chloride, or vinyl chloride copolymer, epoxy resins, amorphous polyolefins, polyesters or the like may be used. Among those, polycarbonate is preferred in view of the humidity resistance, dimensional stability, cost and/or the like. Flash on the product should be removed by varnishing or polishing. Otherwise, ultraviolet curing resin or electron beam curing resin may be coated on the original, for instance, by spin coating or bar coating. The height of the protrusion on the resin substrate is preferably 50 to 1000 nm and more preferably 100 to 500 nm. A magnetic layer is provided over the fine pattern on the surface of the resin substrate, thereby obtaining a master information carrier. The magnetic layer is formed by forming film of a magnetic material by, for instance, vacuum film forming techniques such as sputtering or ion plating or plating.

In the case of perpendicular recording, a master information carrier 3 substantially the same as that employed in in-plane recording is employed. In the case of perpendicular recording, the magnetic layer of the slave medium 2 is magnetized in advance in a perpendicular direction and a transfer magnetic field is applied to the slave medium 2 and the master information carrier 3 in close contact with each other in the direction substantially opposite to the initial magnetic field, whereby the transfer magnetic field is absorbed in the magnetic layer 32 on the upper surface of the protruding portions 32a of the irregularity pattern on the surface of the substrate 31 and accordingly, the magnetic field is not reversed at portions opposed to the protruding portions 32a and is reversed at portions not opposed to the protruding portions 32a. As a result, magnetization pattern corresponding to the irregularity pattern on the master information carrier 3 is transferred to the tracks of the slave medium 2.

A magnetic recording disc such as a hard disc or a high-density flexible disc provided with a magnetic layer on one side or each side thereof is generally employed as the slave medium 2. The magnetic layer thereof is generally of a coated magnetic material or a metal film. In the case of a slave medium having a magnetic layer of metal film, the material of the magnetic layer may be Co, Co alloy (e.g., CoPtCr, CoCr, CoPtCrTa, CoPtCrNbTa, CoCrB, CoNi, Co/Pd), Fe or Fe alloy (e.g., FeCo, FePt, FeCoNi). These materials are preferred in view of obtaining clearer magnetic transfer since the magnetic layer of these materials is higher in magnetic flux density and has a magnetic anisotropy in the same direction in which the magnetic field is applied (the in-plane direction in the case of the in-plane recording and the perpendicular direction in the case of the perpendicular recording). It is further preferred that the magnetic layer of the slave medium 2 be provided with a non-magnetic primer layer in order to give the magnetic layer a necessary magnetic anisotropy. The primer layer should match to the magnetic layer in crystallographic structure and lattice constant. For this purpose, Cr, CrTi, CoCr, CrTa, CrMo, NiAl, Ru or the like may be employed as the non-magnetic primer layer.

The magnetic field generation means for applying the initial magnetic field and the transfer magnetic field comprises a pair of ring type electromagnets each disposed on one side of the slave medium 2 and the master information carrier 3 in a close contact with each other. Each of the electromagnets comprises a core having a gap extending in a radial direction of the slave medium 2 and a winding wound around the core. In the case of the in-plane recording, the ring type electromagnets on opposite sides of the slave medium 2 and the master information carrier 3 in a close contact with each other applies magnetic fields in the same direction in parallel to the tracks. The magnetic field generation means applies a magnetic field to the slave medium 2 and the master information carrier 3 while rotating the slave medium 2 and the master information carrier 3 held in a close contact with each other. Instead of rotating the slave medium 2 and the master information carrier 3, the magnetic field generation means may be rotated. A ring type electromagnet may be disposed on one side of the slave medium 2 and the master information carrier 3 or on each side of the same. A permanent magnet may be employed in place of the electromagnets.

In the case of the perpendicular recording, a pair of electromagnets or a permanent magnets different in polarity are disposed on opposite sides of the slave medium 2 and the master information carrier 3 held in a close contact with each other and a magnetic field is generated in perpendicular to the tracks. When the magnetic field generation means is of a type which applies a magnetic field only a part of the slave medium 2 and the master information carrier 3, the slave medium 2 and the master information carrier 3 held in a close contact with each other and the magnetic field are moved with respect to each other so that a magnetic field is applied to the slave medium 2 and the master information carrier 3 over the entire area thereof.

In accordance with the master information carrier 3 of this embodiment, each protruding portion 32a of the irregularity pattern has end portions which is substantially straight and not arcuate and the fine pattern can be accurately formed even if the track width W is narrowed to not larger than 0.3 μm since the protruding portion 32a is drawn in a plurality of times by an electron beam EB whose drawing diameter d is smaller than the track width W, whereby the recording loss in the transfer magnetic field is reduced, and the magnetization pattern transferred to the slave medium becomes sharp, which results in a high quality transferred signal.

FIGS. 4A and 4B are views respectively illustrating ways of drawing the protruding portions in a master information carrier in accordance with other embodiments of the present invention. Though, in the embodiments shown in FIGS. 2A and 2B, the electron beam EB is moved in a direction parallel to the recording tracks, the electron beam EB is moved in a direction parallel to the direction of width of the recording tracks (a radial direction of the slave medium 2) in the embodiments shown in FIGS. 4A and 4B.

In the embodiment shown in FIG. 4A, the protruding portion 32a is drawn in a direction parallel to the direction of width W of the recording tracks in a plurality of times by an electron beam EB whose drawing diameter d is smaller than the track width W, and the electron beam EB is moved in the same direction in all the scans. Whereas, in the embodiment shown in FIG. 4B, the protruding portion 32a is drawn in a direction parallel to the direction of width W of the recording tracks in a plurality of times by an electron beam EB whose drawing diameter d is smaller than the track width W, and the electron beam EB is alternately moved in the opposite directions.

What is claimed is:

1. A method for producing a master information carrier equipped with a substrate having an irregular pattern corresponding to information to be transferred to high density slave media and a magnetic layer which is coated on the substrate, in which the track width is 0.3 μm or less, comprising:

coating a disk with resist;

drawing a pattern that corresponds to each recess or protrusion of the irregular pattern, by scanning an electron beam having a drawing diameter which is smaller than the track width a plurality of times along a single direction on the resist while rotating the disk;

producing the substrate having the irregular pattern based on the drawing performed by the electron beam; and coating the substrate with the magnetic layer;

wherein irradiation position of the electron beam is being shifted for each scanning operation among the plurality of scanning operations; and wherein the irradiation position is being shifted such that k is 0 or greater and 0.8 or less within a formula $W=[n-(n-1)k]*d$, wherein W is the track width in μm, n is the number of scanning operations, d is the drawing diameter of the electron beam in μm, and k is a coefficient that represents the degree of overlap of the electron beam.

2. The method according to claim 1, wherein the value of n is not smaller than 2.

3. The method according to claim 2, wherein as the value of n increases or as the value of d decreases, and as the value of k increases, the shape of the protruding potions of the irregular pattern becomes more rectangular.

4. The method according to claim 1 wherein the roundness of the protruding portions of the irregular pattern is governed by the drawing diameter d of the electron beam.

5. The method as defined in claim 1, wherein the direction along which scanning is performed is the track direction.

6. The method as defined in claim 1, wherein the direction along which scanning is performed is the track width direction.

7. The method as defined in claim 6, wherein the orientation of the scanning movement of the electron beam is reversed at each scanning operation.

8. The method as defined in claim 1, wherein k=0 is no overlap.

9. The method as defined in claim 1, wherein k=0.8 is a partial overlap.

* * * * *